Nov. 13, 1956 C. W. LUFCY 2,770,770

VACUUM TUBE CONTROLLED MAGNETIC AMPLIFIER

Filed May 22, 1953

INVENTOR
CARROLL W. LUFCY

BY

A. D. O'Brien
R. M. Hicks
ATTORNEYS

1

2,770,770

VACUUM TUBE CONTROLLED MAGNETIC AMPLIFIER

Carroll W. Lufcy, Silver Spring, Md., assignor to the United States of America as represented by the Secretary of the Navy Application May 22, 1953, Serial No. 356,915

5 Claims. (Cl. 323—89)

Figure 1:
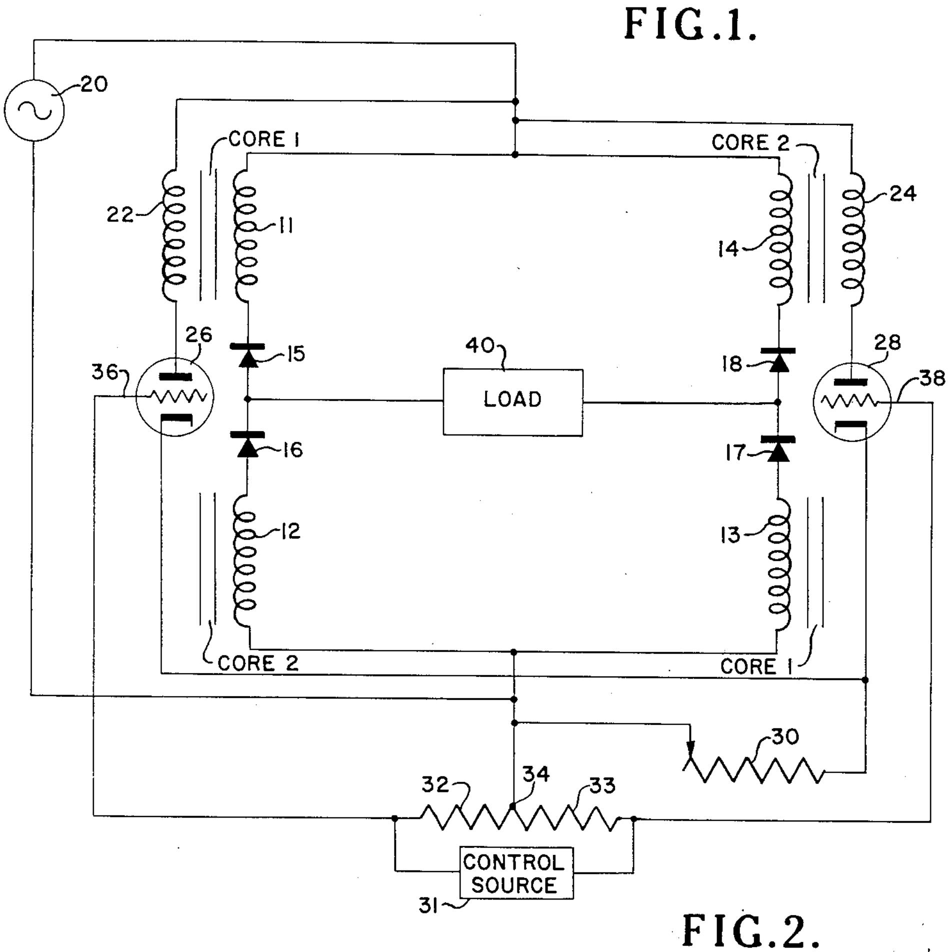

The invention described herein may be manufactured and used by or for the Government of the United States of America for governmental purposes without the payment of any royalties thereon or therefor.

This invention comprises novel and useful improvements in magnetic amplifiers and more particularly pertains to a half-wave bridge magnetic amplifier.

In certain applications of magnetic amplifiers such as in high-performance servo systems, it is necessary to provide a magnetic amplifier having a rapid speed of response and phase reversible A. C. output. Use is commonly made of half-wave bridge magnetic amplifiers in such applications since the half-wave bridge magnetic amplifier can be made to have an inherent speed of response of one cycle of the power supply frequency and in addition provide a pulsating unidirectional output having a high fundamental frequency A. C. component, the magnitude and phase of which is correlative with the amplitude and polarity of the input signal.

Heretofore it has been known to utilize half-wave reference or biasing circuits in conjunction with half-wave bridge magnetic amplifiers to establish the proper operating flux level in the saturable reactor cores during the non-conducting half cycle of the bridge, and to utilize a separate control circuit energized by a control signal source to provide the incremental control flux in the cores during the non-conducting half-cycle of the bridge. Such an arrangement thus necessitates separate control and reference windings on the saturable reactor elements. Further, difficulties are encountered when controlling the magnetic amplifier from a high impedance control source since a large number of turns are then required in the control windings and the voltage induced in the control windings by the current flow in the controlled windings becomes large.

The present invention relates to a combination bias and control circuit for a half-wave bridge magnetic amplifier in which the control and reference flux is established by a single winding on each of the saturable reactor cores which windings are referred to as control windings. The combination control and bias circuits include a grid-controlled vacuum tube connected in series with each of the control windings, which circuits are connected across the power supply source. The tubes are arranged so as to pass current therethrough during the non-conducting half-cycle of the bridge to thereby supply half-wave currents to the control windings on the bridge and establish the proper operating flux level in the cores. The control signal is applied to the control electrodes of the tubes to vary the current flow therethrough and thus vary the flux set in the cores during the flux setting half-cycle of the bridge. The inherent amplifying characteristics of the tubes is such that a small change in control potential on the control electrodes produces a large change in current flow through the tubes whereby the amplification of the stage of the magnetic amplifier is greatly increased. Since the control signal is supplied to the control grids of vacuum tubes,

2 it is apparent that the amplifier may be controlled from a high impedance input signal source. Further, the vacuum tubes isolate the control windings from the control source and thus prevent the flow of circulating currents through the latter due to voltage induced in the control windings by current flowing through the controlled windings of the bridge.

An important object of this invention is to provide a combination control and reference circuit for a half-wave bridge type magnetic amplifier in which both the control and reference fluxes are established by a single winding on each of the cores.

Another object of this invention is to provide a combination control and reference circuit, in accordance with the foregoing objects, which circuit has a high input impedance.

Yet another object of this invention is to provide a combination control and reference circuit for a half-wave bridge type magnetic amplifier in which grid controlled vacuum tubes are utilized to control the application of half-wave reference currents to a single winding on each of the cores of the bridge, and in which no separate D. C. plate supply is required for the vacuum tubes.

Figure 2:
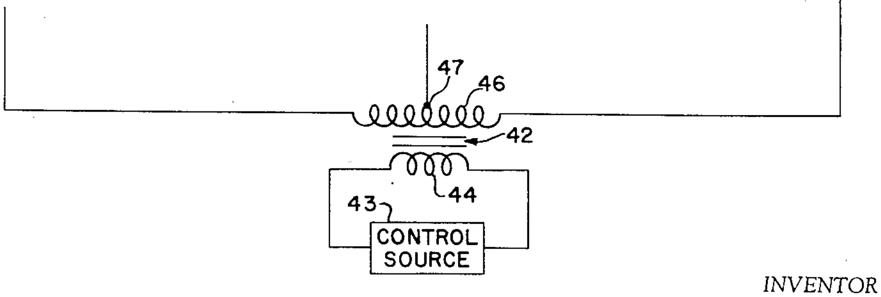

Other objects and many of the attendant advantages of this invention will be readily appreciated as the same becomes better understood by reference to the following detailed description when considered in connection with the accompanying drawings wherein:

Fig. 1 is a schematic diagram of a half-wave bridge type magnetic amplifier utilizing a combination bias and control circuit; and Fig. 2 is a schematic diagram of a modified form of input circuit.

The amplifier illustrated in Fig. 1 comprises controlled or power windings 11, 12, 13 and 14 and rectifiers 15, 16, 17 and 18, the latter preferably being of the dry-disc type. Controlled windings 11 and 13 which constitute one pair of opposing legs in the bridge circuit are wound on one reactor core designated core 1 and controlled windings 12 and 14 which constitute the other pair of opposing legs of the bridge are wound on a second reactor core designated core 2. As is conventional, cores 1 and 2 are preferably so formed as to provide a closed magnetic loop and may conveniently comprise toroidal cores. It is preferable to wind the controlled windings which form opposing legs of the bridge circuit on the same core since, for balanced operation, the controlled windings which form opposing legs must act together. Alternatively, each of the controlled windings may be wound on separate reactor cores. Additionally, one pair of adjacent legs such as windings 12 and 13 may comprise other impedance elements.

In half-wave circuitry, the non-operating half-cycle of the power supply voltage, hereinafter referred to as the flux setting half cycle, is available for the purpose of establishing control. During the flux setting half cycle, the bridge circuit is inactive and its effect upon the control source may be neglected.

In accordance with the present invention, the power supply source 20 which is connected across the bridge circuit so as to thereby energize cores 1 and 2 during one half cycle thereof, is also utilized to supply the reference or bias current. The combination bias and control signal of the present invention comprises a control winding, one on each of the cores in the bridge circuit. If the controlled windings in diagonally opposite legs of the bridge are wound on the same core, as illustrated in Fig. 1, only two such control windings, such as 22 and 24, need be provided, control winding 22 being provided on core 1 and control winding 24 being provided on core 2. Control windings 22 and 24 are each connected in series with the plate-cathode path of grid controlled vacuum tubes 26 and 28 respectively. The combination reference and control circuits are each connected across the power supply source 20 and means such as the variable resistor 30 is provided in the cathode circuits of the vacuum tubes to provide an adjustable bias therefor. Alternatively, separate biasing resistors may be provided in each of the cathode circuits of the tubes 26 and 28 in the event it is desired to permit individual adjustment of the separate control circuits, to thereby compensate for differences in tube characteristics.

Rectifiers 15—18 are each phased so that current flows through the bridge circuit only during one half cycle of the power supply voltage 20, the plate-cathode paths of the vacuum tubes 26 and 28 being arranged so that current flows through the respective control circuits during the succeeding half cycle of the power supply voltage of the source 20. The resistor 30 is adjusted so that the current flowing through the control circuit establishes the proper operating flux level in the saturable reactor cores 1 and 2, under zero control signal conditions.

The control signal from a high impedance source 31 is applied in push-pull across the grid resistors 32 and 33. Each of the resistors 32 and 33 are connected as at 34 to the low potential end of the cathode biasing resistor 30, the voltage appearing across the resistors 32 and 33 being applied respectively to the grids 36 and 38 of the vacuum tubes 26 and 28. Conduction through the vacuum tubes is thus controlled selectively in accordance with the amplitude and polarity of the control signal from source 31 applied in push-pull to the control grids 36 and 38, and consequently the amplitude of the reference flux established in cores 1 and 2 by the control windings 22 and 24, respectively, is differentially varied in accordance with the amplitude of the control signal. In this manner, the control flux is established in cores 1 and 2 and load current flows through the load 40 during the conducting half cycle of the bridge, in a direction and magnitude depending upon the amplitude and polarity of the applied control signal.

Fig. 2 illustrates a modified form of input circuit in which a transformer 42 is utilized to couple the control source 43 to the control tubes 26 and 28. The transformer 42 has a primary 44 to which the control signal is applied, and a center-tapped secondary 46 which is connected to the grids 36 and 38 of the vacuum tubes 26 and 28 respectively. As in the preceding embodiment, the tap 47 on the secondary 46 is connected to the low potential side of the cathode biasing resistor 30 whereby push-pull operation of the vacuum tubes is achieved. By proper choice of the turns ratio between the primary 44 and the secondary 46, it is deemed apparent that proper matching of the input impedance of the amplifier to the control source 43 may be achieved.

In operation under zero control signal conditions, the bridge is balanced and quiescent current flows down the sides of the bridge so that the resultant current flow through the load 40 is zero. However, when a control signal is applied to the grids 36 and 38, in push-pull, conduction through tubes 26 and 28 is differentially varied so as to thereby differentially vary the flux set in cores 1 and 2, during the flux setting half cycle of the magnetic amplifier. During the succeeding conducting half cycle of the amplifier, cores 1 and 2 will saturate at a point during the power supply voltage cycle dependent upon the level of the flux preset in the cores. After one of the cores saturates, and before the other core saturates, current flows through the load 40 in a direction dependent upon which of the cores saturates, the bridge being rebalanced after both cores saturate.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a half-wave magnetic amplifier comprising four impedance elements, at least two of said impedance elements comprising controlled windings each wound on a core of saturable magnetic material, means connecting said controlled windings to form separate parallel branch circuits therewith, each parallel branch including one of said controlled windings, means including a source of A. C. potential having one side connected to said controlled windings and the other side connected to said first mentioned means for applying an A. C. potential to said branch circuits, unidirectional impedance elements connected in said branch circuits and arranged so that current flows through the controlled windings only during one half cycle of the A. C. potential applied to said branch circuits, a control winding on each of said cores, means connecting said control windings to said source of A. C. potential, asymmetrical conducting means in series with each of said control windings and arranged so that current flows through said control windings on the other half cycle of said A. C. potential and means including said last mentioned means and responsive to a control signal for differentially varying the current flow through said control windings.

2. A half-wave magnetic amplifier comprising four impedance elements, at least two of said impedance elements comprising controlled windings wound on cores of saturable magnetic material, means connecting said controlled windings to form separate parallel branch circuits therewith, each parallel branch including one of said controlled windings, means including a source of A. C. potential having one side connected to said controlled windings and the other side connected to said first mentioned means for applying an A. C. potential to said branch circuits, unidirectional impedance elements connected in said branch circuits and arranged so that current flows through the controlled windings only during one half cycle of said applied A. C. potential, a control winding on each of said cores, a pair of grid-controlled tubes, a pair of series circuits each including the plate-cathode paths of one of said tubes and one of said control windings, means connecting said series circuits to said A. C. potential source whereby current flows through the control windings during the other half-cycle of said A. C. potential, and means for applying a control signal in push-pull to the control grids of said tubes to differentially vary the current flow therethrough.

3. A half-wave magnetic amplifier comprising four impedance elements, at least two of said impedance elements comprising controlled windings wound on cores of saturable magnetic material, means connecting said controlled windings to form separate parallel branch circuits therewith, each parallel branch including one of said controlled windings, means including a source of A. C. potential having one side connected to said controlled windings and the other side connected to said first mentioned means for applying an A. C. potential to said branch circuits, unidirectional impedance elements connected in said branch circuits and arranged so that current flows through the controlled windings only during one half cycle of said A. C. potential, a control winding on each of said cores, a pair of grid-controlled tubes, a pair of series circuits each including the plate-cathode paths of one of said tubes and one of said control windings, means connecting said series circuits to said A. C. potential source whereby current flows through the control windings during the other half-cycle of said A. C. potential, means responsive to current flow through said series circuits for applying a predetermined bias on the grids of said tubes, and means for applying a control signal in push-pull to the control grids of said tubes to differentially vary the current flow therethrough.

4. A half-wave magnetic amplifier comprising four impedance elements, at least two of said impedance elements comprising controlled windings each wound on a core of saturable magnetic material, means connecting the controlled windings to form separate parallel branch circuits therewith, each of said branch circuits including one of said controlled windings, means including a source of A. C. potential having one side connected to said controlled windings and the other side connected to said first mentioned means for applying an A. C. potential to said branch circuits, unidirectional impedance elements connected in said branch circuits and arranged so that current flows through said controlled windings only during one half cycle of said A. C. potential, a control winding on each of said cores, a pair of tubes each having a plate, a control grid and a cathode, means connecting the plates of each of said tubes to one of said control windings, means connecting the cathodes of said tubes to each other and to a cathode biasing resistor, means connecting said source of A. C. potential to said control windings and to said biasing resistor whereby current flows through said control windings during the other half cycle of said A. C. potential, and means for applying a control signal to the grids of said vacuum tubes.

5. The combination of claim 4 wherein said last mentioned means includes an impedance element having a center-tap thereon connected to said biasing resistor, the ends of said last mentioned impedance element being connected to said control grids to control the current flow therethrough.

References Cited in the file of this patent

UNITED STATES PATENTS

| | | |
|---|---|---|
| 2,403,891 | Lamm | July 9, 1946 |
| 2,453,624 | Glass | Nov. 9, 1948 |
| 2,509,738 | Lord | May 30, 1950 |
| 2,545,507 | Williams | Mar. 20, 1951 |
| 2,571,223 | Edinburg | Oct. 16, 1951 |
| 2,573,818 | Votruba | Nov. 6, 1951 |

OTHER REFERENCES

AIEE Technical Paper 51–217, "On the Mechanics of Magnetic Amplifier Operation," by Ramey, May 2, 1951, pp. 19–24, Fig. 16.